Jan. 3, 1939.   E. N. ANKETELL   2,142,627
ADJUSTING MEANS FOR OPTICAL INSTRUMENTS
Filed Dec. 11, 1936
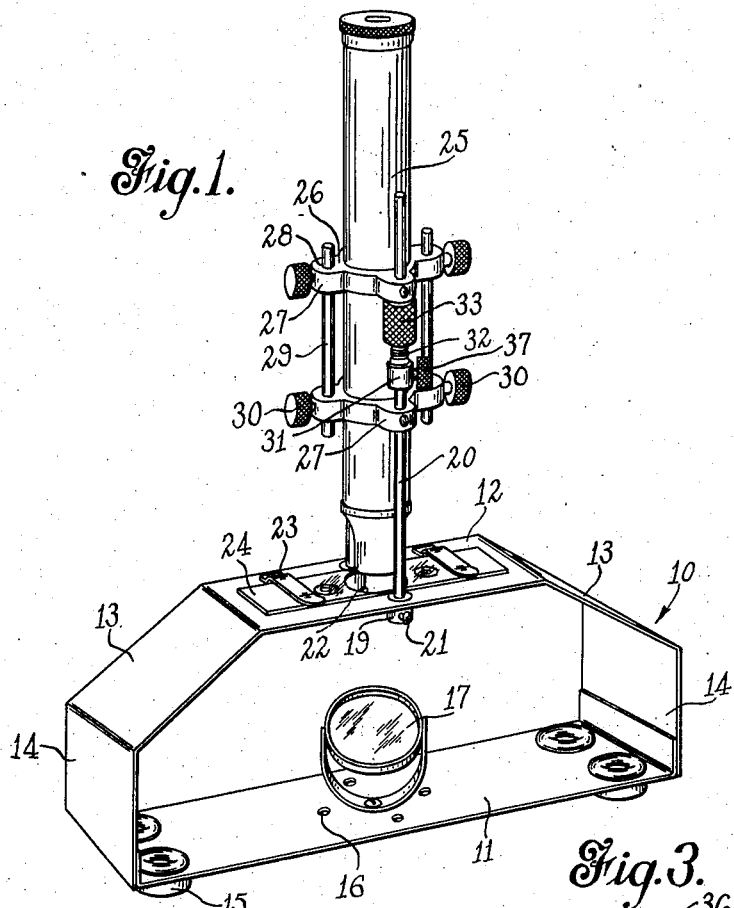
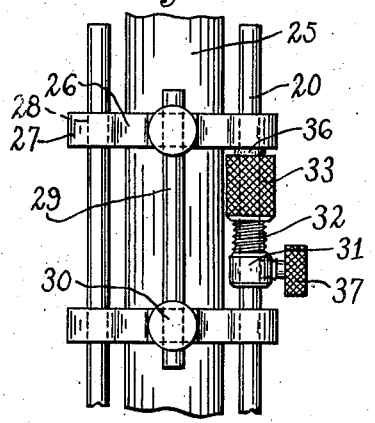
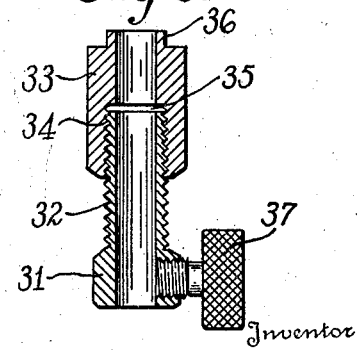

Patented Jan. 3, 1939

2,142,627

UNITED STATES PATENT OFFICE 2,142,627

ADJUSTING MEANS FOR OPTICAL INSTRUMENTS

Edward N. Anketell, New Haven, Conn., assignor to A. C. Gilbert Company, New Haven, Conn., a corporation of Maryland Application December 11, 1936, Serial No. 115,375

5 Claims. (Cl. 88—39)

This invention relates to adjusting means for optical instruments, and more particularly to an adjusting device adapted to be used with parts of a toy set from which various optical instruments may be fabricated and the device applied in such a manner that the instrument may be readily adjusted for use.

In the use of certain optical devices such as microscopes, for example, it is necessary to adjust the instrument so that it may be properly focussed. In order to secure the best results, the device should be capable of a relatively fine degree of adjustment, and this, of course, is true not only of so-called microscopes, but of any magnifying glass which may be employed. The present invention relates to such adjusting means, and more particularly to an adjusting means which may be assembled when the device is fabricated from a set of parts from which a number of devices of various kinds may be constructed.

One object of the present invention is the provision of adjusting means for optical instruments which may be readily and conveniently assembled when the optical instrument is constructed, and which will render adjustment of the device simple and practical.

A still further object of the invention is the provision of an optical instrument slidably mounted upon upstanding rods, with an adjusting means whereby the instrument may be raised or lowered longitudinally of the rods, and thereby adjusted to a relatively fine degree of adjustment.

To these and other ends the invention consists in the novel features and combinations of parts to be hereinafter described and claimed.

In the drawing:

Fig. 1 is a perspective view of an optical device embodying my invention;

Fig. 2 is a side elevational view showing the adjusting device; and

Fig. 3 is a sectional view of the adjusting device.

To illustrate a preferred embodiment of my invention, I have shown in Fig. 1 a support designated generally by the numeral 10, the support comprising a lower base 11 and an upper base 12, these two bases being connected by the side members 13 and 14. The lower base 11 may be provided with feet 15 of rubber or similar material upon which the base may rest, and also may have provision such as the openings 16 for connecting a light-transmitting member such as the mirror 17 to the lower base.

The upper base 12 is provided with a plurality of sockets 19, these sockets having openings therethrough within which rods 20 may be slidably received, the lower ends of the rods being fixed in position within the sockets by means of the set screws 21. Any number of these sockets may be provided, as desired. As shown, four are provided arranged symmetrically around an opening 22 in the base. Also, upon the upper base 12 may be provided spring clips or the like 23 to hold a slide 24.

The rods 20, of which two are shown in the drawing, are designed to slidably support an optical instrument such as the microscope 25. This member is embraced by one or more flange couplings 26, these couplings comprising a ring-like body portion adapted to embrace the body of the microscope, and projecting ears 27 provided with openings 28 adapted to receive the rods 29, these rods being held in place by set screws 30 threaded laterally into the lugs or ears 27. In the form shown, a microscope is formed of detachable sections, and therefore is provided with two of these flanged couplings, the parts being held together by means of the rods 29.

The rods 20 also pass through certain of the lugs 27 and are slidably received within the openings in these lugs so that the microscope or other optical device may be adjusted longitudinally of the rods 20.

The adjusting device, as shown more particularly in Figs. 2 and 3, comprises a lower tubular portion or sleeve 31 having exterior threads 32 designed to threadedly receive an upper tubular portion 33 having interior threads 34 within a socket 35 within which the threaded portion 32 is adapted to be received. At the upper end of the portion 33 is provided a reduced neck 36 designed to engage below one of the lugs 27. The outer surface of the member 33 may be knurled so that it may be readily turned upon the member 31 and threadedly adjusted with relation to this member.

Both members 31 and 33 are tubular and are adapted to receive therein the rod 20, the member 31 being fixed to the rod in the desired position by means of the set screw 37.

When the parts are assembled, the adjusting device consisting of the members 31 and 32 is placed upon one of the rods 20. It may be placed between the two flange couplings 26, as shown in the drawing, or below the lower flange coupling, it only being necessary that it be so placed that the reduced upper portion 36 of the member 33 shall engage the lug of one of the flange couplings so as to hold this coupling and the optical instrument secured thereto in the desired position. When the adjusting device has been placed in the proper position upon the rod 20, the screw 37 is set against the rod so as to hold the lower member 31 in fixed position. It will be seen that with the parts assembled as described, the optical device, such as the microscope, may be readily adjusted by the operator turning with his fingers the knurled tubular member 33, which, when threaded up or down upon the member 31, will serve to raise or lower the microscope until the desired adjustment is obtained.

It will be apparent that this provides for adjustment of the optical instrument in a very simple way, and by a device which may be very readily assembled when the optical instrument is put together. Moreover, the adjusting device itself may be made very economically, and it will, therefore, add little to the cost of the same.

While I have shown and described a preferred embodiment of my invention, it will be understood that it is not to be limited to all of the details shown, but is capable of modification and variation within the spirit of the invention and within the scope of the appended claims.

What I claim is:

1. In a device of the character described, a base having means for supporting an object to be observed, rods projecting upwardly from the base, a magnifying device, means for adjustably supporting the device relatively to the base, said means comprising an element connected to the device and slidably engaged with the rods, a second element slidably mounted on one of said rods, means for securing said element to the rod, a third element interposed between the first and second-named elements and having an adjustable connection with the second element capable of relatively fine adjustment to move the first element and the magnifying device relatively to the base.

2. In a device of the character described, a base having means for supporting an object to be observed, rods projecting upwardly from the base, a magnifying device, means for adjustably supporting the device relatively to the base, said means comprising an element connected to the device and slidably engaged with the rods, a second element slidably mounted on one of said rods, means for securing said element to the rod, a third element interposed between the first and second-named elements and having a rotatably adjustable connection with the second element capable of relatively fine adjustment to move the first element and the magnifying device relatively to the base.

3. In a device of the character described, a base having means for supporting an object to be observed, rods projecting upwardly from the base, a magnifying device, means for adjustably supporting the device relatively to the base, said means comprising an element connected to the device and slidably engaged with the rods, a second element slidably mounted on one of said rods, means for securing said element to the rod, a third element interposed between the first and second-named elements and having a threadedly adjustable connection with the second element capable of relatively fine adjustment to move the first element and the magnifying device relatively to the base.

4. In a device of the character described, a base having means for supporting an object to be observed, rods projecting upwardly from the base, a magnifying device, means for adjustably supporting the device relatively to the base, said means comprising an element connected to the device and slidably engaged with the rods, a sleeve-like member slidably mounted on one of said rods, means for securing said member to the rod, a second sleeve-like member interposed between the first member and said element, and said second member having an adjustable connection with the first member capable of relatively fine adjustment to move said element and the magnifying device relatively to the base.

5. In a device of the character described, a base having means for supporting an object to be observed, upright members carried by the base, a magnifying device, means for adjustably supporting the device relatively to the base, said means comprising an element connected to the device and slidably engaged with said upright members, a two-part adjusting device, said device comprising a part slidable upon one of said upright members, means for securing said part to said upright member, and a second part engaging said element from below and having an adjustable connection with the first part capable of relatively fine adjustment to move said element and magnifying device relatively to the base.

EDWARD N. ANKETELL.